United States Patent [19]

Tanaka et al.

[11] 4,376,194

[45] Mar. 8, 1983

[54] POLYESTER AMIDE AND PROCESS FOR PRODUCING THE SAME

[75] Inventors: Chiaki Tanaka, Chita; Shinobu Nakashima; Nagayoshi Naito, both of Nagoya, all of Japan

[73] Assignee: Toray Industries, Inc., Tokyo, Japan

[21] Appl. No.: 293,629

[22] PCT Filed: Dec. 22, 1980

[86] PCT No.: PCT/JP80/00316

§ 371 Date: Aug. 17, 1981

§ 102(e) Date: Aug. 17, 1981

[87] PCT Pub. No.: WO81/01854

PCT Pub. Date: Jul. 9, 1981

[30] Foreign Application Priority Data

Dec. 21, 1979 [JP] Japan ................................ 54-165588
Dec. 28, 1979 [JP] Japan ................................ 54-170350
Jan. 22, 1980 [JP] Japan .................................... 55-6213

[51] Int. Cl.$^3$ ...................... C08G 63/44; C08G 69/44
[52] U.S. Cl. .................................... 528/288; 528/292; 528/302
[58] Field of Search ............... 528/289, 290, 291, 292, 528/288

[56] References Cited

U.S. PATENT DOCUMENTS

| 2,891,929 | 6/1959 | Caldwell et al. | 528/290 |
| 2,946,769 | 7/1960 | Rose et al. | 528/291 |
| 3,213,065 | 10/1965 | Bunge et al. | 528/292 X |
| 3,304,290 | 2/1967 | Chapman et al. | 528/292 X |
| 3,377,321 | 4/1968 | Van Strien et al. | 528/289 |
| 3,660,356 | 5/1972 | Radlmann et al. | 528/292 |
| 3,996,201 | 12/1976 | Buxbaum | 528/292 X |
| 4,002,600 | 1/1977 | Habermeier | 260/75 N |
| 4,101,524 | 7/1978 | Burzin et al. | 528/288 |

FOREIGN PATENT DOCUMENTS 49-129794 12/1974 Japan .

OTHER PUBLICATIONS

T. M. Laakso and D. D. Reynolds, "Polyesteramides", 10/31/59, *Journal of the American Chemical Society*, vol. 82, pp. 3640–3642, (1960).

*Primary Examiner*—Lucille M. Phynes
*Attorney, Agent, or Firm*—Austin R. Miller

[57] ABSTRACT

A polyester amide having excellent mechanical strength, transparency, resistance to oil, adhesive property and heat-sensitivity, comprises (A) an ester unit derived mainly from a benzenedicarboxylic acid and 1,4-butanediol and (B) an amide unit consisting of dodecaneamide and/or undecaneamide, the weight ratio of the ester unit to the amide unit being from 5:95 to 95:5.

12 Claims, 3 Drawing Figures

POLYESTER AMIDE AND PROCESS FOR PRODUCING THE SAME

TECHNICAL FIELD

The present invention relates to a novel polyester amide which is excellent in mechanical strength, impact resistance, transparency, flexibility, oil resistance, thermal aging resistance, adhesive property, solvent solubility and heat sensitivity, and a process for producing the same. More particularly, the present invention relates to an adhesive made from the polyester amide which is suited for use in bonding fibers and metals.

BACKGROUND OF THE INVENTION

Because of their excellent mechanical properties, particularly high modulus and strength, and high resistance to light and water, polyesters, a typical example of which is polyethylene terephthalate, are widely used as a material for the production of fibers, films and other shaped articles. On the other hand, because of their excellent abrasion resistance, dyeing property and chemical resistance as well as excellent mechanical strength, polyamides, a typical example of which is polycaprolactam and polyhexamethylene adipamide, are widely used as a material for the production of fibers, films and other shaped articles which are used for purposes other than those of the polyester products.

Polyesters and polyamides have their individual excellent properties as described above. However, two types of these polymers also have disadvantages. In order to eliminate their respective disadvantages, it was attempted, heretofore, to combine these polymers with each other. For example, in order to impart an excellent dyeing property and a high abrasion resistance to the polyester, it was attempted to combine a polyester component with a polyamide component as a modifier. Inversely, in order to improve a low rigidity of the polyamide and a change in the physical properties due to its hygroscopicity, it was attempted to combine a polyamide component with a polyester component as a modifier. However, as far as the inventors of the present invention know, most of the conventional attempts have not succeeded in putting a polyester amide having an ester linkage and an amide linkage in the molecule to practical use. Only in the field of heat-resistant resins, a process for producing a polyester amide from a dicarboxylic acid containing an amide linkage and a diol is known. However, this is a very special case. This process requires the use of expensive starting materials and thus, is not suitable for general use. Also, the process steps and the performance of the polyester amide are extremely unique.

As an example for general examination, there can be mentioned a process for producing a polyester amide which comprises melt-mixing a polyester such as polyethylene terephthalate and a polyamide such as polycaproamide to effect a partial ester-amide exchange reaction, thereby producing a polyester-polyamide block copolymer. This process has the disadvantages that because of poor compatibility between the polyester and the polyamide, only a very small amount of the co-component can be introduced into the base component, and the mixture tends to decompose, which results in a colored product.

In another attempt, the introduction of the co-component was carried out at the polymerization stage. However, in the case where an ester-forming compound is present in a polyamide polymerization system, a high polymer can not be obtained due to the hydrolysis of the resulting ester component. On the other hand, in the case where a polyamide-forming component is present in a polyester polymerization system, for example, when the polyamide-forming component is ε-caprolactam, the lactam is distilled off from the polymerization system, and when the polyamide-forming component is a hexamethylenediamine-adipic acid salt, this compound is incompatible with the polyester-forming component and exhibits a poor reactivity thereto. Therefore, a useful polyester amide can not be obtained.

The inventors of the present invention found that when a specific polyamide-forming component and a specific polyester-forming component are copolymerized with each other, a polyester amide copolymer having a high degree of polymerization and exhibiting performances which could not be anticipated in the past can be obtained without encountering the above-mentioned problems in the production process, such as poor compatibility, low reactivity, coloration and monomer vaporization.

It was found that the specific polyester-forming component and the specific polyamide-forming component undergo uniform polymerization without causing phase separation over a total range of copolymerization composition, thereby providing a non-colored polymer having a high degree of polymerization, and that the resultant polyester amide is a flexible polymer excellent in mechanical strength, impact resistance, transparency, softness and solvent solubility, and therefore, it is useful as a material for the production of fibers, films and other shaped articles.

The polyester amide having a specific composition has a high adhesive strength to general fibers and provides an adhesive joint having an excellent hand and exhibiting a high water resistance and a high resistance to perchloroethylene (high dry-cleaning resistance). Therefore, this type of polyester amide was found to be a useful material as a hot-melt adhesive for fibers.

In addition, the polyester amide having another specific composition has a high adhesive strength to metallic materials such as copper, aluminum, tin, iron, stainless, tinplate and chromium-treated steel plate and provides an adhesive joint excellent in processability and stability. Therefore, this type of polyester amide was found to be a useful material as an adhesive for metals.

In addition, the polyester amide of the present invention exhibits a unique heat-sensitive property and thus, it was found to be a useful heat-sensitive material.

On the basis of the above mentioned backgrounds, the present invention was accomplished.

SUMMARY OF THE INVENTION

The present invention is a polyester amide comprising (A) an ester unit derived mainly from a benzenedicarboxylic acid and 1,4-butanediol and (B) an amide unit consisting of dodecaneamide and/or undecaneamide in a weight ratio of ester unit to amide unit of from 5:95 to 95:5, i.e. a polyester amide having a composition falling on or within a region, in a triangular composition diagram in FIG. 1, defined by the co-ordinates A, B, C and D, and a process for producing the same. Also, the present invention is a hot-melt adhesive for fibers which comprises a polyester amide having a composition falling on or within a region, in a triangular composition diagram in FIG. 2, defined by the co-ordinates E, F, G, H I and J. In addition, the present invention is an adhesive for metals which comprises a polyester amide having a composition falling on or within a region, in a triangular composition diagram in FIG. 3, defined by the co-ordinates K, L, M and N.

PREFERRED EMBODIMENT OF THE INVENTION

An ester unit which is one component of the polyester amide of the present invention is composed mainly of a benzenedicarboxylic acid and 1,4-butanediol. The benzenedicarboxylic acid can be selected from the group consisting of terephthalic acid, isophthalic acid and phthalic acid. Among these, terephthalic acid and isophthalic acid are preferable. That is, an ester unit comprising butylene terephthalate and/or butylene isophthalate provides a preferable polyester amide. The ester unit of the polyester amide is mainly derived from the benzenedicarboxylic acid and 1,4-butanediol. However, in the preparation of the ester unit, a small amount of up to 30 molar % of at least one monomer component selected from the group consisting of dicarboxylic acids such as adipic acid, sebacic acid, dodecanedioic acid, naphthalenedicarboxylic acid and cyclohexanedicarboxylic acid; diols such as ethylene glycol, pentanediol, neopentyl glycol, 1,6-hexanediol and cyclohexanedimethanol and polyfunctional compounds such as trimesic acid, glycerine and pentaerythritol may be used as the comonomer.

The dodecaneamide and/or undecaneamide unit (hereinafter referred to as polyamide unit) which is the other component constituting the polyester amide of the present invention is a polymer unit which is derived from 12-aminododecanoic acid and/or 11-aminoundecanoic acid and represented by the formulae:

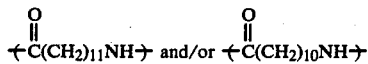

The polyester amide of the present invention may contain one polydodecaneamide and polyundecaneamide or a combination thereof in copolymerized form. In either case, the polymerizability of the polyamide units and the physical properties of the resultant polyester amide are almost the same. However, for the purpose of controlling the melting point, crystallinity and solubility of the resultant polyester amide, an appropriate selection of the polyamide unit is possible.

Figure 1:
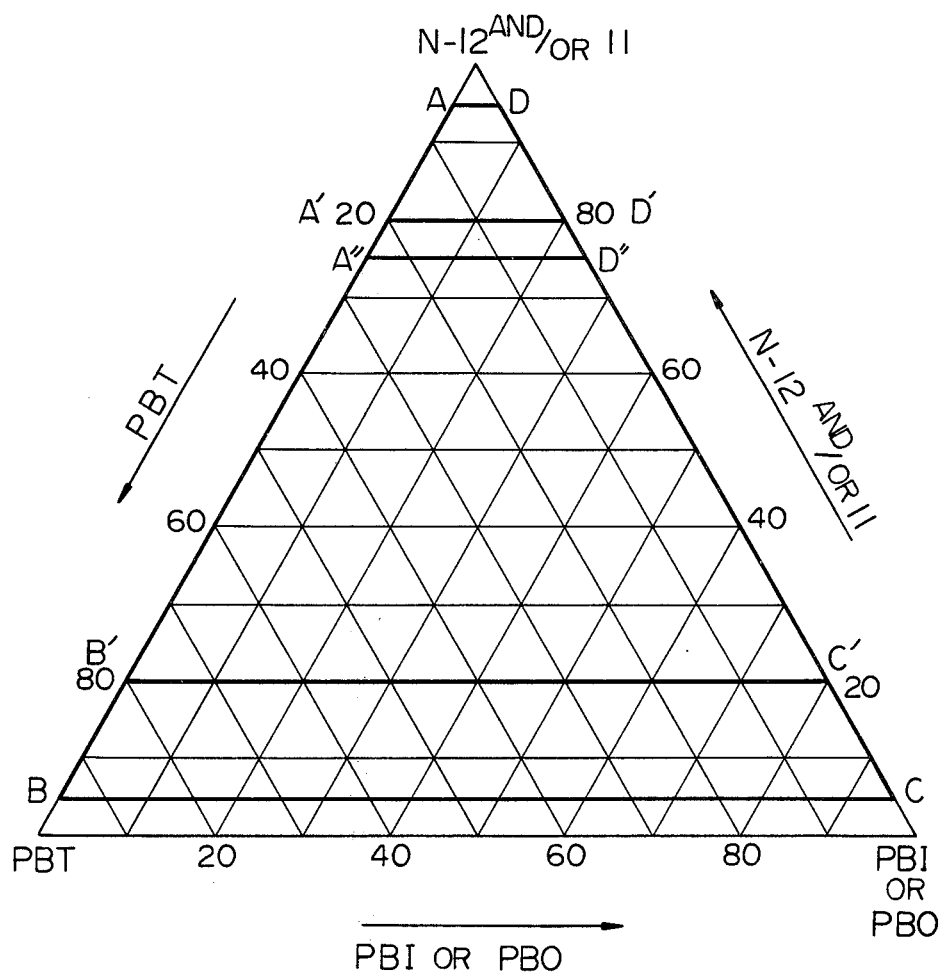
FIG. 1 is a triangular diagram showing a composition of a polyester amide of the present invention, which composition falling on or within a region defined by the co-ordinates, A, B, C and D.

It is important for the polyester amide of the present invention to use a selective combination of polybutylene terephthalate and/or polybutylene (iso)phthalate, as the polyester unit, with polydodecaneamide and/or polyundecaneamide, as the polyamide unit. The copolymerization system for the polyester amide according to the present invention undergoes uniform polymerization without causing phase separation over a total range of copolymerization composition, thereby to provide a non-colored polymer having a high degree of polymerization. Moreover, the resultant novel copolymer is a flexible polymer exhibiting some or all of the following properties: high mechanical strength, high impact resistance, excellent transparency, high softness, high oil resistance, high thermal aging resistance, excellent adhesive property, high solvent solubility and high heat sensitivity. The weight ratio of polyester structural unit to polyamide structural unit in the polyester amide of the present invention is in a range of from 5:95 to 95:5, which range falling on or within a region defined by the co-ordinates A, B, C and D as is shown in FIG. 1, preferably from 20:80 to 95:5, which range falling on or within a region defined by the co-ordinates A', B, C and D' as is shown in FIG. 1, and more preferably from 25:75 to 80:20, which range falling on or withing a region defined by the co-ordinates A", B', C' and D". The polyester amide having the above mentioned copolymerization composition exhibits a new and outstanding performance which could not be anticipated on the basis of the performances of polyesters such as polybutylene terephthalate and polybutylene terephthalate/-polybutylene (iso)phthalate copolymer and polyamides such as polydodecaneamide and polyundecaneamide.

The polyester amide of the present invention can be prepared by melt-polymerizing a mixture of (a) a dicarboxylic acid comprising terephthalic acid and/or (iso)phthalic acid, (b) 1,4-butanediol and (c) 12-aminododecanoic acid and/or 11-aminoundecanoic acid. In accordance with one preferable polymerization process usable for the present invention, an aromatic dicarboxylic acid comprising terephthalic acid and/or (iso)phthalic acid is first reacted with 1,4-butanediol in a molar amount of 1.05 to 2.0 times that of the aromatic dicarboxylic acid and 12-aminododecanoic acid and/or 11-aminoundecanoic acid, in the presence of a conventional esterification catalyst, at a temperature of from about 150° to 260° C. under atmospheric pressure. The polymerization system is preferably nitrogen-sealed from the ambient atmosphere. Then, the reaction mixture is subjected to polycondensation at a temperature of from 200° to 270° C. under a reduced pressure of 10 mmHg or less, preferably, 1 mmHg or less, so as to prepare a polyester amide having a high degree of polymerization which becomes transparent when melted. Also, in another preferable polymerization process, the aromatic dicarboxylic acid and 1,4-butanediol are prepolymerized together under esterification conditions comprising a temperature of from 150° to 260° C. and atmospheric pressure so as to prepare a polyester prepolymer having an average degree of polymerization of from 3 to 8. Then, the prepolymer and 12-aminododecanoic acid and/or 11-aminoundecanoic acid are placed in a polymerizer and the reaction mixture is polycondensed at a temperature of from 200° to 270° C. under reduced pressure. Thus, a homogeneous polyester amide having a high degree of polymerization is obtained. In the case where the polyester prepolymer is polymerized with the aminocarboxylic acid, the polyester prepolymer may be prepared by using lower alkyl esters of terephthalic acid and/or (iso)phthalic acid. The 12-aminododecanoic acid from which the polyamide unit of the present invention is derived is preferably used in single form. However, part or all of the 12- aminododecanoic acid may be used in the form of laurolactam derived from the dehydration cyclization of the 12-aminododecanoic acid. In the case where the amount of the polyamide-forming component is small, a slight extension of the reaction time can produce a desired polyester amide.

In the preparation of the polyester amide, the use of a titanium-based catalyst provides excellent results. The particularly preferable catalysts are tetraalkyl titanates such as tetrabutyl titanate and tetramethyl titanate and metal salts of titanium oxalate such as potassium titanium oxalate. Other useful catalysts for the present invention include tin compounds such as dibutyltin oxide and dibutyltin laurate and lead compounds such as lead acetate.

In the preparation of the polyester amide of the present invention, a small amount of at least one member selected from the group consisting of other dicarboxylic acids, for example, naphthalenedicarboxylic acid, adipic acid and sebacic acid, other diols, for example, cyclohexanedimethanol and 1,6-hexanediol, and polyfunctional compounds, for example, trimesic acid, glycerine and pentaerythritol may be used as the comonomer.

In the above-mentioned process for preparing the polyester amide of the present invention, the average segment length of the polyester unit and the polyamide unit generally depends on the compositional ratio of the resultant product. However, the average segment length may also be controlled by adjusting the reaction conditions. For example, when 12-aminododecanoic acid and/or 11-aminoundecanoic acid is added to the polymerization system during the preparation of the polyester prepolymer, the resultant polyester amide has a larger average segment length of each of these two units than that of a polyester amide resulting from a one-stage polymerization of all the monomers. Therefore, the former polyester amide exhibits a melting point above several degrees centigrade to 20° C. higher than that of the latter polyester amide. Accordingly, optimal conditions for the preparation of the polyester amide should be suitably selected depending on the use of the polyester amide.

The polyester amide copolymer of the present invention may contain additives such as stabilizers, for example, anti-oxidants, thermal stabilizers, light stabilizers, hydrolytic stabilizers, coloring materials, flame-retardants, reinforcing materials, fillers, molding additives and plasticizers. These additives may be added during or after the polymerization procedure but before the molding procedure.

Figure 2:
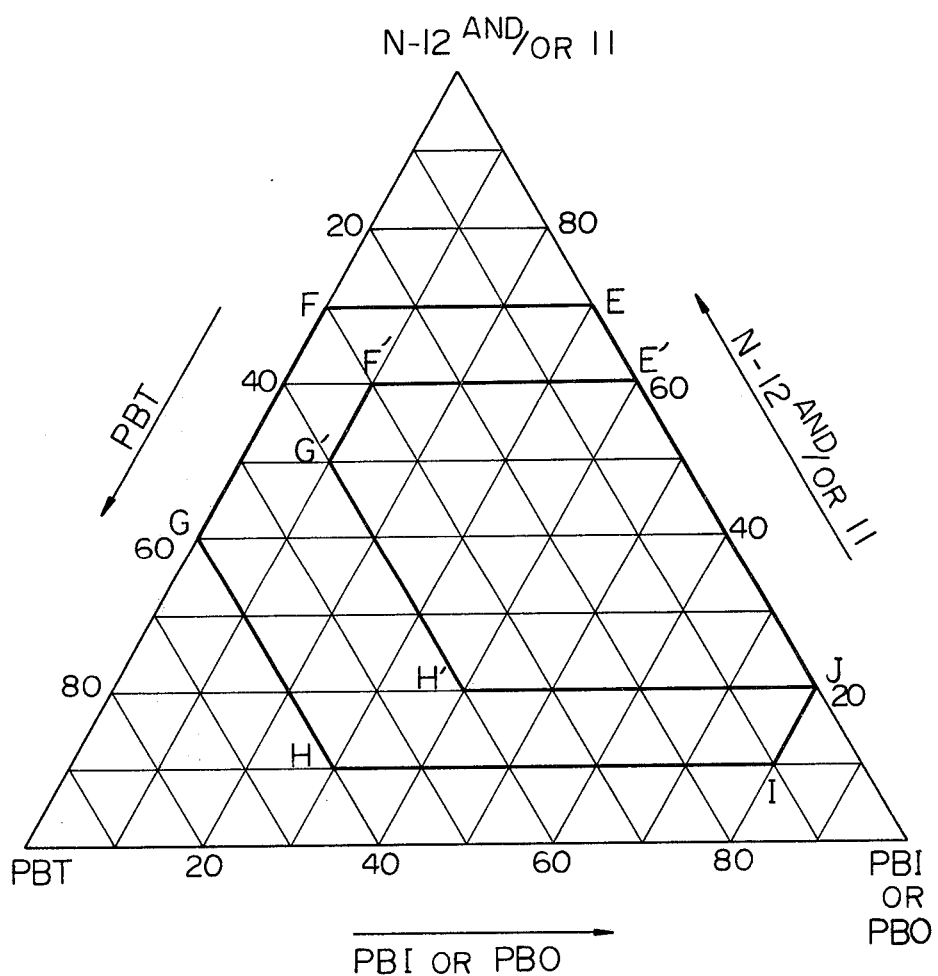
FIG. 2 is a triangular diagram showing a composition of a hot-melt adhesive for fibers according to the present invention, which composition falls on or within a region defined by the co-ordinates E, F, G, H, I and J.

The polyester amide of the present invention is a material useful for fibers, films, other shaped articles, hot-melt adhesives, solution adhesives, and coating materials. In order that the polyester amide is particularly useful as a hot-melt adhesive for fibers, it should have a copolymerization composition falling or within a region, in a triangular composition diagram shown in FIG. 2, defined by the co-ordinates E, F, G, H, I and J, preferably, the co-ordinates E', F', G', H' and J. Compositional ratios other than the above mentioned ratios can not produce a hot-melt adhesive for fibers having desirable properties. The co-ordinates shown in the triangular composition diagram shown in FIG. 2 concretely indicate the following compositions: (unit: % by weight)

|   | N-11 and/or N-12 | PBT | PBI(O) |
|---|---|---|---|
| F | 70 | 30 | 0 |
| G | 40 | 60 | 0 |
| H | 10 | 60 | 30 |
| I | 10 | 10 | 80 |
| J | 20 | 0 | 80 |
| E | 70 | 0 | 30 |

The polyester amide having the above mentioned copolymerization composition exhibits a novel and outstanding performance which could not be anticipated on the basis of the performances of polyesters such as polybutylene terephthalate and polybutylene terephthalate/polybutylene (iso)phthalate copolymers, polyamides such as polydecaneamide and polyundecaneamide and polydodecaneamide-based polyamide copolymers conventionally used as an adhesive for fibers.

The hot-melt adhesive for fibers according to the present invention should have a melting point or softening point of from 80° to 180° C. A hot-melt adhesive having too low a softening point is unsatisfactory in heat resistance, workability and molding processability. On the other hand, a hot-melt adhesive having too high a softening point causes damage to the performance and hand of the fabric to be bonded. A hot-melt adhesive having a relatively high melting or softening point of from 120° to 180° C. may be used as such for bonding purposes. However, a plasticizer, adhesive mass, adhesive aid or thermoplastic resin having a low melting point and good fluidity may be added to the hot-melt adhesive so as to improve the low temperature adhesive property thereof. The melt viscosity or degree of polymerization of the polyester amide can be varied within such a range that the relative viscosity of the polyester amide is in a range of from about 1.25 to 3.0 measured at a concentration of 0.5% in o-chlorophenol.

The hot-melt type polyester amide can be used in the form of powders, films or threads in the bonding of fibers. When the polyester amide is used in the form of powders, it is cooled by means of a cooling medium such as liquid nitrogen and the cooled polyester amide is pulverized in a pulverizer. Sometimes, the resultant powder is mixed with a lubricant such as magnesium stearate, calcium stearate, silicic anhydride and talc so as to prepare an adhesive powder. The powder, with or without the lubricant, is subject to a coating processing by using a dotting machine or a scattering machine, thereby producing an adhesive base material. When the polyester amide is shaped into films, a melt film-forming method is preferably used. That is, the polyester amide in the form of chips or powders is fed into an extruder and melted therein at a temperature about 20° to 100° C. higher than the melting temperature of the polyester amide, and then, extruded through a die attached to the extruder, so as to form a film. Usually, the resultant film is not positively drawn. Sometimes, the film is cut to a tape of a predetermined size. The film or tape is interposed between the same or different types of fabrics and the resultant sandwich laminate is pressed by means of a hot roller, a hot press or an iron, so that the fabrics are bonded to each other through the heat-melted film or tape. The fibers which can be bonded by means of the hot-melt adhesive of the present invention include synthetic fibers such as polyester, polyamide and acrylic fibers, natural fibers such as wool and cotton and mixed fibers thereof. The hot-melt adhesive of the present invention may also be used in the bonding of emblems and name marks.

Figure 3:
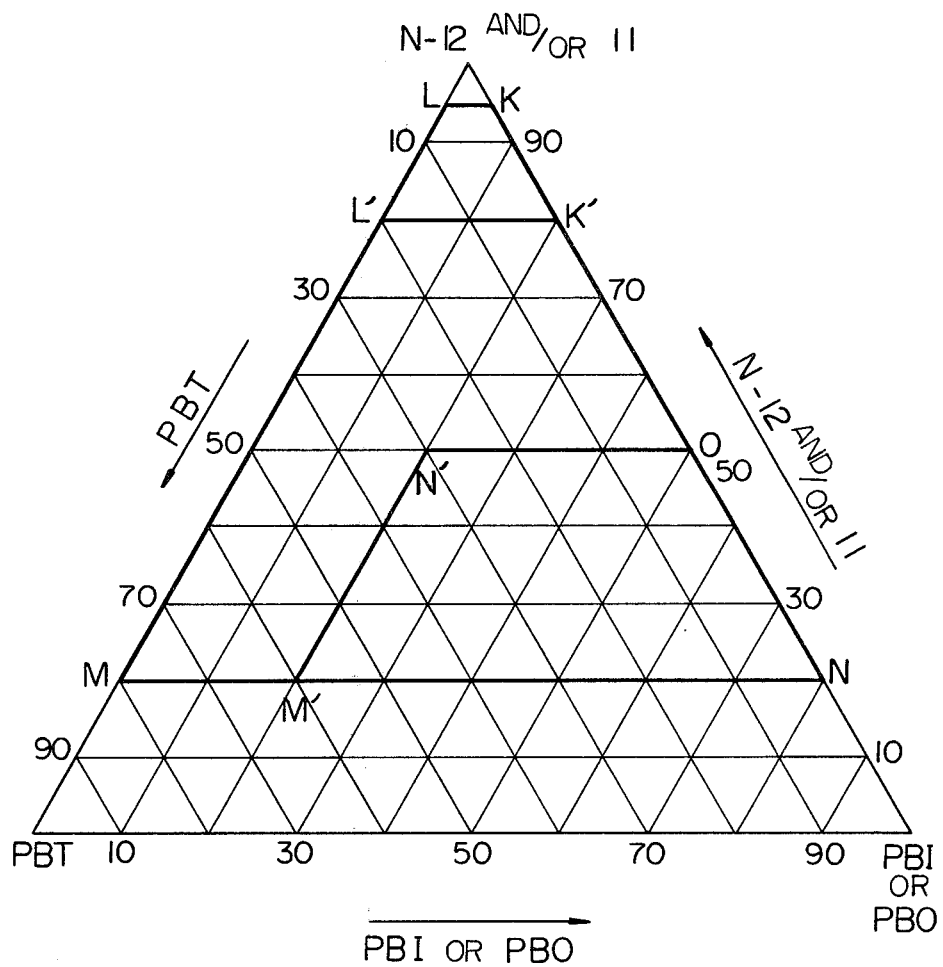
FIG. 3 is a triangular diagram showing a composition of an adhesive for metals according to the present invention, which composition falling on or within a region defined by the co-ordinates K, L, M and N.

The polyester amide which can be used as an adhesive for metals should have a weight ratio of ester unit (A) to amide unit (B) of from 5:95 to 80:20. Particularly, it is necessary that the proportions by weight of the butylene terephthalate unit (PBT), the butylene isophthalate unit (PBI) or butylene phthalate unit (PBO), which units constitute the ester unit (A), and the dodecaneamide unit (N-12) and/or undecaneamide unit (N-11) which constitutes the amide unit (B) in the polyester amide falls on or within a region, in a triangular composition diagram shown in FIG. 3, defined by the co-ordinates K, L, M and N. Compositional ratios other than the above-mentioned ratios can not produce an adhesive for metals having desirable properties. The polyester amide having a copolymerization composition falling on or within the hatched portion of the above mentioned region, in the triangular composition diagram shown in FIG. 3, defined by the co-ordinates K', L', M, M', N' and O is a hot-melt type adhesive exhibiting excellent adhesive property and water resistance. On the other hand, the polyester amide having a copolymerization composition falling on or within the non-hatched portion of the above-mentioned region, defined by the co-ordinates O, N', M' and N is rather a solution type adhesive which serves as an adhesive aid or a binder in the bonding of metals. The co-ordinates shown in the triangular composition diagram shown in FIG. 3 concretely indicate the following compositions: (unit: % by weight)

|    | N-11 and/or N-12 | PBT | PBI (or PBO) |
|----|------------------|-----|--------------|
| K  | 95               | 0   | 5            |
| L  | 95               | 5   | 0            |
| M  | 20               | 80  | 0            |
| N  | 20               | 0   | 80           |
| O  | 50               | 0   | 50           |
| N' | 50               | 30  | 20           |
| M' | 20               | 60  | 20           |
| K' | 80               | 0   | 20           |
| L' | 80               | 20  | 0            |

The polyester amide having the above-mentioned copolymerization composition exhibits excellent adhesive property and adhesion durability which could not be anticipated on the basis of the performances of conventional metal adhesives such as nylon-11, nylon-12 or copolyamide composed mainly of nylon-11 and/or nylon-12, and polyesters such as polybutylene terephthalate and polybutylene terephthalate polybutylene isophthalate copolymers.

With regard to the degree of polymerization of the polyester amide of the present invention which is useful as the adhesive for metals, there is no particular limitation. However, in general, the degree of polymerization of the polyester amide is such that the relative viscosity of the polyester amide is in a range of from about 1.25 to 3.0, preferably from 1.3 to 2.0 measured at a concentration of 0.5% in o-chlorophenol at a temperature of 25° C. In order that the polyester amide is useful as the metal adhesive, the melting or softening point thereof is suitably 210° C. or less. In the case where the polyester amide is applied in the form of a hot-melt type adhesive to food cans, it should withstand a heat sterilization procedure at a temperature of from 100° to 125° C. In this case, therefore, the polyester amide should preferably have a melting or softening point of from 150° to 200° C. When the melting or softening point of the polyester amide is higher than 210° C., such polyester amide causes the bonding procedure to become difficult. In addition, when the bonding procedure is carried out at a temperature higher than 210° C., the polyester amide itself is degraded and the organic paint applied on the can material to be bonded is also degraded. These degradations cause the adhesive power of the polyester amide to become poor.

The metal adhesive of the present invention can be used in the form of powders, films or solution in bonding of metals. When the adhesive is shaped into films, a melt film-forming method is preferably used. That is, the adhesive in the form of chips or powders is fed into a conventional extruder and melted therein at a temperature of about 20° to 100° C. higher than the melting temperature of the polyester amide, and then, extruded through a die attached to the extruder, so as to form a film. Usually, the resultant film is not positively drawn. Sometimes, the film is cut to a tape of a predetermined size. The so-obtained adhesive film or tape is applied on the portion of metal to be bonded and then, the applied film or tape is melted. Then, the portion of another metal to be bonded is placed on the melted film or tape on the first metal and pressure is applied on the contacted portions. Finally, the melted adhesive is solidified by cooling, so as to complete the bonding of the metals. The adhesive powder can be prepared in such a manner that the adhesive is first cooled by means of a cooling medium such as liquid nitrogen and the cooled adhesive is pulverized in a pulverizer, and if necessary, the so-obtained powder is mixed with a lubricant such as magnesium stearate, calcium stearate, silicic anhydride and talc. In the case where the adhesive in the form of powder is used, the powders are first applied on the portion of a metal to be bonded by means of fluidization dip coating or spray coating. Thereafter, the above-mentioned procedures are repeated, so as to complete a metal-to-metal bond.

The metal adhesive of the present invention may be heat-melted in an extruder and extruded on the portion of a metal to be bonded through a die attached to the extruder. Then, the portion of another metal to be bonded is brought into pressure contact with the melted adhesive on the first metal, so as to complete the bonding of these metals. Also, the adhesive in the form of a solution in a specific solvent may be applied on the portion of a metal to be bonded and the portion of another metal to be bonded is then brought into pressure contact with the adhesive solution-applied portion. Finally, the adhesive is dried by evaporating the solvent so as to complete the bonding of these metals.

The metal adhesive of the present invention exhibits a strong adhesive strength to a metal, the surface of which has no primer coating applied thereon, and is excellent in chemical resistance. In the case where the adhesive is used for bonding a tin free steel strip for a retort food which is subjected to a sterilization process at high temperatures and pressures, the provision of a primer coating on the portion of the strip to be bonded is effective for enhancing the adhesion durability thereof. Examples of the primer are epoxy-phenol resins, phenol-formaldehyde resins, epoxy-phenoxy resins, epoxy-urea resins and melamine resins.

Coated metal materials obtained by using the metal adhesive of the present invention according to any of the above mentioned bonding methods exhibit a high peeling strength and an excellent heat resistance, and therefore, are very useful as an interior or exterior material for metal containers such as cans, machines, buildings, ships and automobiles and as a coated wire.

With regard to a metal material to which the adhesive of the present invention is applicable, there is no special limitation. Examples of metal materials to which the present adhesive is applicable are a non-treated steel strip (black steel strip), a phosphatized steel strip, a chromatized steel strip, an electrolytically chromatized steel strip, a chromium- or zinc-plated steel strip, iron, aluminum, chromium-treated aluminum, copper, silver-plated copper, tin and a tinplate.

The present invention is illustrated by the following examples. In the examples, all "parts" or "%" are by weight. The relative viscosity was determined at a concentration of 0.5% of the polyester amide in o-chlorophenol at a temperature of 25° C. The melting point indicates a melting peak temperature of the polyester amide which was determined according to DSC (Perkin Elmer DSC-IB), unless otherwise indicated. The adhesive power was determined by interposing an adhesive to be tested between two pieces of fabrics, metallic sheets or foils, press-bonding the sandwich laminate and subjecting it to a T-peeling test by using Tensilon manufactured by Toyo Sokki K.K.

EXAMPLE 1

166 parts of terephthalic acid, 135 parts of 1,4-butanediol and 0.22 parts of titanium tetrabutoxide were placed in a flask. After the interior of the flask was purged with nitrogen gas, the contents of the flask were heated to a temperature of 220° C. while stirring the mixture. The reaction mixture was maintained with stirring at that temperature for 3 hours and 30 minutes. After the water and THF formed during the esterification reaction were distilled off from the polymerization mixture, the whole of the resultant polyester prepolymer was transferred into a polymerizer equipped with a helical ribbon stirrer made of stainless steel. 240.5 parts of 12-aminododecanoic acid, 0.10 parts of titanium tetrabutoxide and 0.44 parts (0.1% based on the weight of the prepolymer) of "Irganox 1010" as a stabilizer were added to the polymerizer. The mixture was brought to reaction conditions comprising a temperature of 245° C. and a pressure of 0.1 mmHg in about one hour. Then, the mixture was maintained at those conditions for 3 hours and 10 minutes while stirring the reaction mixture. At the end of that time, a clear viscous liquid was obtained. The resultant polymer contained in the polymerizer was discharged into water in the form of a strand and the strand was passed through a cutter to pelletize it.

The resultant polymer had a compositional ratio by weight of polybutylene terephthalate to polydodecaneamide of 50:50 and exhibited a relative viscosity ($\eta r$) of 1.50, a melting point (Tm) of 178° C. and a crystallizing temperature (Tc) of 82° C.

| Result of elemental analysis | Theoretical value (%) | Observed value (%) |
|---|---|---|
| C | 69.25 | 69.10 |
| H | 8.62 | 8.75 |
| N | 3.55 | 3.58 |

Main peak of infrared absorption spectra (IR) 3310, 3080, 2940, 2860, 1730, 1645, 1550, 1470, 1415, 1270, 1120, 1030, 950, 880, 735 cm$^{-1}$

EXAMPLES 2 THROUGH 6

Five types of polyester amides each having a compositional ratio by weight of polybutylene terephthalate to polydodecaneamide as indicated in Table 1 were prepared according to the same procedures as those described in Example 1. All of the resultant polyester amides in the form of a melt were clear. When each of the polyester amides was converted to a strand in water, the strand became a cloudy white in a short period of time, which indicated a high rate of crystallization of the polymer.

The elemental analysis, melting point, crystallizing temperature, and solution viscosity ($\eta r$) of the polyester amides and the degree of crystallinity of the polyester amides which was determined from the X-ray diffraction line profile thereof are summarized in Table 1.

The main peaks of the infrared absorption spectra for the polyester amide of Example 3 are as follows.
3320, 2930, 2860, 1720, 1655, 1540, 1510, 1460, 1415, 1395, 1270, 1120, 1025, 945, 925, 880, 735 cm$^{-1}$.

TABLE 1

| Example No. | Polymer composition (wt. ratio) | | Elemental analysis | | | | | | DSC | | | Degree of crystallinity (%) |
| | PBT[1] | N-12[2] | Theoretical value | | | Observed value | | | Tm (°C.) | Tc[3]. (°C.) | $\eta r$ | |
| | | | C | H | N | C | H | N | | | | |
| 2 | 90 | 10 | | | | | | | 220 | 181 | 1.52 | 39 |
| 3 | 75 | 25 | 67.35 | 7.06 | 1.78 | 67.20 | 7.19 | 1.75 | 202 | 151 | 1.45 | 31 |
| 4 | 65 | 35 | | | | | | | 184 | 130 | 1.49 | 23 |
| 1 | 50 | 50 | 69.25 | 8.62 | 3.55 | 69.10 | 8.75 | 3.58 | 178 | 82 | 1.50 | 9 |
| 5 | 35 | 65 | | | | | | | 152 | 106 | 1.43 | 18 |
| 6 | 25 | 75 | 71.14 | 10.19 | 5.33 | 71.30 | 10.15 | 5.41 | 161 | 120 | 1.48 | 22 |

[1]Polybutylene terephthalate unit
[2]Polydodecaneamide unit
[3]Crystallizing temperature

EXAMPLES 7 THROUGH 10

In each of Examples 7 through 10, a polyester amide was prepared according to the same procedures as those described in Example 1, except that isophthalic acid was used in place of the terephthalic acid and the weight ratio of polybutylene isophthalate unit to polydodecane amide unit was as shown in Table 2.

The resultant polyester amides were soft and flexible and exhibited a high mechanical strength. The physical properties of these polymers are summarized in Table 2.

TABLE 2

| Example No. | Polymer composition (wt. ratio) | | Elemental analysis | | | | | | ηr | Tm (°C.) | Mechanical properties*[2] | |
|---|---|---|---|---|---|---|---|---|---|---|---|---|
| | | | Theoretical value | | | Observed value | | | | | Breaking stress (kg/cm$^2$) | Ultimate elongation (%) |
| | PBI*[1] | N-12 | C | H | N | C | H | N | | | | |
| 8 | 75 | 25 | 67.35 | 7.06 | 1.78 | 67.18 | 7.30 | 1.75 | 1.48 | 115 | 270 | 480 |
| 9 | 60 | 40 | 68.10 | 7.99 | 2.84 | 68.33 | 7.74 | 2.91 | 1.44 | 125 | 310 | 450 |
| 7 | 50 | 50 | 69.25 | 8.62 | 3.55 | 69.02 | 8.84 | 3.79 | 1.46 | 135 | 300 | 500 |
| 10 | 25 | 75 | 71.14 | 10.19 | 5.33 | 70.98 | 10.27 | 5.17 | 1.44 | 156 | 420 | 450 |

*[1] Polybutylene isophthalate unit
*[2] A testpiece was prepared by punching a pressed film having a thickness of 100μ

The main peaks of the infrared absorption spectra for each of the polybutylene isophthalate/polydodecaneamide polyester amides were as follows (the sign * indicates a peak having a very high intensity of absorption).

| Example No. | |
|---|---|
| 8 | 3310, 2930*, 2860, 1735*, 1650, 1615, 1550, 1475, 1445, 1400, 1310*, 1250*, 1140, 1100, 1080, 735* cm$^{-1}$ |
| 9 | 3320, 2960*, 2860, 1735*, 1650*, 1615, 1550*, 1475, 1440, 1400, 1310*, 1250*, 1170*, 1100, 1085, 960, 740* cm$^{-1}$ |
| 10 | 3300*, 3090, 2950*, 2855, 1735*, 1650*, 1555*, 1470*, 1310, 1260*, 1170*, 1010, 1085, 740* cm$^{-1}$ |

EXAMPLES 11 AND 12

2.00 parts of terephthalic acid, 1.33 parts of isophthalic acid, 3.25 parts of 1,4-butanediol, 2.41 parts of 12-aminododecanoic acid and 0.0018 parts of titanium tetrabutoxide were placed in a reaction vessel. After the interior of the vessel was purged with nitrogen gas, the contents of the vessel were heated at a temperature of 230° C. for 3 hours and 45 minutes while stirring the reaction mixture. After 1.25 parts of a mixture of the water, THF and 1,4-butanediol were distilled off from the reaction mixture, the resultant reaction mixture was transferred into a polymerizer and 0.0037 parts of titanium tetrabutoxide and 0.0066 parts of "Irganox 1010" were added to the polymerizer. The mixture was brought, in about one hour, to reaction conditions comprising a temperature of 245° C. and a pressure of 0.1 mmHg or less. The polymerization reaction was continued under these conditions for 1 hour and 55 minutes. At the end of that period, a transparent viscous polymer was obtained (Example 11).

Separately, the same procedures as those described above were repeated except that the 12-aminododecanoic acid was not used in the esterification reaction, and instead thereof, it was charged into the polymerizer in the same manner as in Example 1. (Example 12)

Although the resultant polymers had the same compositional ratio of PBT:PBI:N-12=60:40:50, the polymer of Example 12 exhibited a higher melting point than the polymer of Example 11 as is shown in Table 3.

TABLE 3

| | | Example No. | |
|---|---|---|---|
| | | 11 | 12 |
| ηr | | 1.41 | 1.40 |
| Tm (°C.) | | 102 | 123 |
| Elememtal analysis (%) | | | |
| Theoretical value | C | 67.98 | the same as the left column |
| | H | 7.57 | |
| | N | 2.37 | |
| Observed value | C | 67.85 | 67.74 |
| | H | 7.56 | 7.67 |
| | N | 2.32 | 2.40 |
| Infared absorption spectra | | 3340, 2940, 2860, | |
| Main peak (cm$^{-1}$) | | 1730, 1650, 1545, | |
| Examples 11 and 12 are the same | | 1470, 1415, 1270, 1110, 1030, 950, 880, 735 | |

EXAMPLES 13 THROUGH 25

In each of Examples 13 through 25, a polyester amide having a compositional ratio as indicated in Table 4 was prepared according to the process described in Example 1 wherein a polyester prepolymer is previously prepared from terephthalic acid, isophthalic acid and 1,4-butanediol, and then, 12-aminododecanoic acid is mixed with the polyester prepolymer to carry out the polymerization of the resultant reaction mixture. The polyester amide was obtained as a homogeneous transparent melt having a light yellow color. All of these polyester amides exhibited an excellent softness and a high flexibility.

TABLE 4

| Example No. | Polymer composition (wt. ratio) | | | Appearance of solidified polymer | ηr | Tm (°C.) |
|---|---|---|---|---|---|---|
| | PBT | PBI | N-12 | | | |
| 13 | 80 | 20 | 30 | Whitened (High crystallizing rate) | 1.49 | 162 |
| 14 | 80 | 20 | 100 | Whitened (High crystallizing rate) | 1.49 | 134 |
| 15 | 65 | 35 | 50 | transparent | 1.51 | 133 |
| 16 | 50 | 50 | 12 | transparent | 1.47 | 121 |
| 17 | 50 | 50 | 19 | transparent | 1.42 | 115 |
| 18 | 50 | 50 | 30 | transparent | 1.39 | 117 |
| 19 | 50 | 50 | 40 | transparent | 1.40 | 110 |
| 20 | 50 | 50 | 50 | transparent | 1.51 | 103 |
| 21 | 50 | 50 | 100 | whitened | 1.42 | 149 |
| 22 | 50 | 50 | 150 | whitened | 1.44 | 152 |
| 23 | 50 | 50 | 300 | whitened | 1.41 | 157 |
| 24 | 40 | 60 | 31 | transparent | 1.45 | 80 |

TABLE 4-continued

| Example No. | Polymer composition (wt. ratio) | | | Appearance of solidified polymer | ηr | Tm (°C.) |
|---|---|---|---|---|---|---|
| | PBT | PBI | N-12 | | | |
| 25 | 20 | 80 | 100 | transparent | 1.47 | 143 |

EXAMPLE 26

The polyester amides as indicated in Table 5 which were selected from the polyester amides of Examples 1 through 25 were estimated for solvent solubility. When the polyester amides were soluble, the resultant solutions all were superior in stability.

TABLE 5

| Polyester amide Example No. | Solvent | | | | |
|---|---|---|---|---|---|
| | Methyl alcohol | Chloroform | THF | MEK | chlorobenzene |
| 8 | IS | S | SW | IS | S |
| 9 | IS | S | S | IS | S |
| 12 | IS | S | S | IS | S |
| 20 | IS | S | S | IS | S |
| 22 | IS | SW | IS | IS | S |
| 25 | IS | SW | SW | IS | S |

S ... soluble
IS ... insoluble
SW ... swelling occurred

EXAMPLE 27

3.00 parts of terephthalic acid, 2.93 parts of 1,4-butanediol, 2.70 parts of 11-aminoundecanoic acid and 0.0020 parts of titanium tetrabutoxide were placed in a reaction vessel. After the interior of the vessel was purged with nitrogen gas, the contents of the vessel were heated at a temperature of from 215° to 220° C. for 3 hours and 30 minutes while stirring the reaction mixture. Then, the resultant reaction mixture was transferred into a polymerizer and 0.0040 parts of titanium tetrabutoxide and 0.0070 parts of "Irganox 1010" were added to the polymerizer. The mixture was heated at a temperature of 245° C. under a reduced pressure of 0.1 mmHg while stirring the reaction mixture to polymerize the mixture. After the polymerization for about 3 hours, a transparent viscous polymer was obtained.

The resultant polyester amide had a compositional ratio by weight of polybutylene terephthalate to polyundecaneamide of 6 to 4 and was crystalline.

The properties and elemental analysis of the polyester amide and the mechanical properties of a pressed sheet prepared from the polyester amide are shown in Table 6.

TABLE 6

| Elementary analysis (%) | | |
|---|---|---|
| Theoretical value | C | 68.10 |
| | H | 7.91 |
| | N | 3.06 |
| Observed value | C | 68.05 |
| | H | 8.10 |
| | N | 2.88 |
| Tm (°C.) | | 183 |
| ηr | | 1.52 |
| Mechanical properties | | |
| Yield stress (kg/cm$^2$) | | 350 |
| Yield strain (%) | | 15 |
| Tensile strength (kg/cm$^2$) | | 450 |
| Ultimate elongation (%) | | 510 |
| Tensile modulus (kg/cm$^2$) | | 4,200 |

EXAMPLE 28 (A HOT-MELT ADHESIVE FOR FIBERS)

99.6 parts of terephthalic acid, 66.4 parts of isophthalic acid, 135 parts of 1,4-butanediol and 0.22 parts of titanium tetrabutoxide were placed in a flask. After the interior of the flask was purged with nitrogen gas, the contents of the flask were heated at a temperature of 220° C. for 3 hours and 30 minutes while stirring the reaction mixture. After the water and THF formed during the esterification reaction were distilled from the polymerization mixture, the whole of the resultant polyester prepolymer was transferred into a polymerizer equipped with a helical ribbon stirrer made of stainless steel. 120 parts of 12-aminododecanoic acid, 0.10 parts of titanium tetrabutoxide and 0.33 parts (0.1% based on the weight of the prepolymer) of "Irganox 1010" as a stabilizer were added to the polymerizer. The mixture was brought, in about one hour, to reaction conditions comprising a temperature of 245° C. and a pressure of 0.1 mmHg. Then, the mixture was maintained at those conditions for 2 hours and 40 minutes while stirring the reaction mixture. At the end of that time, a clear viscous melt was obtained. The resultant polymer contained in the polymerizer was discharged into water in the form of a strand and the strand was passed through a cutter to pelletize it.

The resultant polymer was a polyester amide having a compositional ratio by weight of polybutylene terephthalate: polybutylene isophthalate: polydodecaneamide=40:27:33 and exhibiting a relative viscosity (ηr) of 1.39 and a melting point of 123° C.

The pellets of the polyester amide so prepared were heated to a temperature of 160° C. and pressed into a film having a thickness of 100μ. The film was slit to a tape having a width of 1 cm. The tape was interposed between two pieces of polyester/cotton (65/35) broadcloth (T/C broadcloth). The resultant laminate was heat-bonded under a pressure of 300 g/cm$^2$ for 10 seconds by means of a hot pressing machine heated to a temperature of 150° C. The bonded part exhibited a high peeling strength of 3.4 kg/cm.

The resistance to perchloroethylene and hot water laundry of the polyester amide were tested in the following manner. Two tapes, each having a width of 1 cm which were prepared by slitting the film, were separately immersed in perchloroethylene and water heated to temperatures of 40° C. and 60° C., respectively. After the immersion for 30 minutes, each of the immersed tapes were directly subjected to a tensile testing by using a strain gauge. Both of these tapes exhibited a tensile strength of 150 kg/cm$^2$ or more and an ultimate elongation of 600% or more.

For comparison purposes, two types of films made from a commercial copolyamide (6/66/610/12 copolymer: a melting point of 117° C.) and a commercial copolyester (terephthalic acid/adipic acid/ethylene glycol/diethylene glycol copolymer: a melting point of 127° C.) were subjected to the same testing. The former copolyamide film completely lost its original tensile strength and ultimate elongation after being immersed in water at a temperature of 60° C., while the latter copolyester film completely lost its original tensile strength and ultimate elongation after being immersed in perchloroethylene at a temperature of 40° C.

EXAMPLE 29

Twelve types of polyester amides each having a compositional ratio by weight as indicated in Table 7 were prepared according to the same procedures as those described in Example 28. The melting point and relative viscosity of the polyester amides and the tensile modulus, and the resistance to perchloroethylene and water of the films made from these polyester amides were determined. The polyester amides within the range of the present invention all exhibited a low melting point and were flexible, and retained a high tensile strength and ultimate elongation in perchloroethylene and in water.

pressure of 300 g/cm$^2$ for 10 seconds. The bonded fabric was subjected to a dry-cleaning test by using a dry cleaner. The bonded fabric was first immersed in perchloroethylene for 8 minutes while stirring the contents, and then, the fabric was centrifugally desolvented for 5 minutes and finally, the solvent-removed fabric was dried at a temperature of 60° C. for 7 minutes so as to deodorize it. This cycle was repeated five times. Separately, the bonded fabric was subjected to water washing. That is, the fabric was stirred in warm water containing 2% of powdered soap at a temperature of 60° C., for 5 minutes, and then, the immersed fabric was dehydrated for one minute and finally, was air-dried. This cycle was also repeated five times. After one cycle

TABLE 7

| No. | Polymer composition (wt. ratio) PBT | PBI | N-12 | Tm (°C.) | $\eta r$ | Tensile modulus (kg/cm$^2$) | Tensile strength/ultimate elongation of immersed film (kg/cm$^2$)/(%) 40° C. Perchloroethylene | 60° C. Water |
|---|---|---|---|---|---|---|---|---|
| A | 43.5 | 23.5 | 33 | 133 | 1.38 | | >(120/600) | >(105/600) |
| B | 44 | 44 | 12 | 121 | 1.39 | 1,500 | 90/550 | >(130/600) |
| C | 42 | 42 | 16 | 119 | 1.39 | 840 | 115/480 | >(110/600) |
| D | 38.5 | 38.5 | 23 | 117 | 1.41 | 550 | >(70/600) | >(90/600) |
| E | 25 | 25 | 50 | 149 | 1.36 | 1,200 | >(120/600) | >(80/600) |
| F | 20 | 20 | 60 | 152 | 1.38 | 2,000 | >(150/600) | >(90/600) |
| G | 10 | 40 | 50 | 143 | 1.37 | | >(140/600) | >(80/600) |
| H | 0 | 75 | 25 | 115 | 1.37 | | 50/550 | >(100/600) |
| I | 0 | 60 | 40 | 125 | 1.40 | | >(125/600) | >(90/600) |
| J | 0 | 50 | 50 | 135 | 1.38 | | >(140/600) | 80/500 |
| K | 0 | 25 | 75 | 156 | 1.41 | | >(125/600) | 40/300 |
| L | 40 | 10 | 50 | 134 | 1.40 | 2,400 | >(230/600) | >(150/600) |

PBT: polybutylene terephthalate
PBI: polybutylene isophthalate
N-12: polydodecaneamide

EXAMPLE 30

2.00 parts of terephthalic acid, 1.33 parts of isophthalic acid, 3.25 parts of 1,4-butanediol, 2.41 parts of 12-aminododecanoic acid and 0.0018 parts of titanium tetrabutoxide were placed in a reaction vessel. After the interior of the vessel was purged with nitrogen gas, the contents of the vessel were heated at a temperature of 230° C. for 3 hours and 45 minutes while stirring the reaction mixture. After 1.25 parts of a mixture of the water and THF formed and the non-reacted 1,4-butanediol were distilled off from the reaction mixture, the resultant reaction mixture was transferred into a polymerizer and 0.0037 parts of titanium tetrabutoxide and 0.0066 parts of "Irganox 1010" were added to the polymerizer. Thereafter, the mixture was brought, in about one hour, to reaction conditions comprising a temperature of 245° C. and a pressure of 0.1 mmHg or less. The mixture was maintained at those conditions for 1 hour and 55 minutes. At the end of that time, a transparent viscous polymer was obtained.

The resultant polyester amide had a compositional ratio by weight of PBT:PBI:N-12=40:27:33 and exhibited a relative viscosity of 1.41 and a melting point of 102° C. A melt of the polyester amide was extruded through a spinneret having a plurality of spinning orifices and the extruded filaments were collected by means of an air stream. The filaments were deposited in the form of a net (web) on the surface of a polyester substrate to prepare an adhesive base fabric. The adhesive was deposited in an amount so that the coverage became 10 g/m$^2$.

A woven fabric made from a blend of polyester/wool (50/50) fibers were superposed on the adhesive-deposited surface of the base fabric and the superposed fabrics were hot-pressed at a temperature of 140° C. under a and five cycles of each test were completed, the adhesive power of these samples were determined. The results are shown in Table 8. No partial peeling was observed in the bonded part and the bonded fabric exhibited excellent dry-cleaning resistance and hot water laundry resistance.

TABLE 8

| | Adhesive strength (g/5cm) |
|---|---|
| Before laundry | 1,200 |
| Dry-cleaning | |
| after one cycle | 1,050 |
| after five cycles | 900 |
| Hot water laundry | |
| after one cycle | 1,250 |
| after five cycles | 1,200 |

EXAMPLE 31

Pellets of the polyester amide No. 1 as prepared in Example 29 were thoroughly cooled with liquid nitrogen, and the cooled pellets were pulverized together with dry ice in a pulverizer. The resultant finely divided particles were passed through a sieve and dressed to a mesh size of from 80 to 250. The dressed powders were spread on the surface of a cotton fabric at a coverage of 12 g/m$^2$. A woven fabric (wool pola) made entirely from wool was superposed on the powder-applied surface of the cotton fabric and the superposed fabrics were hot-pressed at a temperature of 150° C. under a pressure of 300 g/cm$^2$ for 10 seconds. The bonded fabric exhibited an adhesive strength of 1,250 g/5 cm. After being subjected to the same full automatic dry-cleaning test as that described in Example 30, the bonded fabric exhibited a high retention of adhesive strength of 1,150 g/5 cm. Also, after being subjected to a hot water laundry at a temperature of 60° C., the bonded fabric exhibited an adhesive strength of 1,200 g/5 cm.

EXAMPLE 32

1.50 parts of terephthalic acid, 1.50 parts of isophthalic acid, 2.93 parts of 1,4-butanediol, 2.70 parts of 11-aminoundecanoic acid and 0.0020 parts of titanium tetrabutoxide were placed in a reaction vessel. After the interior of the vessel was purged with nitrogen gas, the contents of the vessel were heated at a temperature of from 215° to 220° C. for 3 hours and 20 minutes while stirring the reaction mixture. Then, the resultant reaction mixture was transferred into a polymerizer and 0.0040 parts of titanium tetrabutoxide and 0.0070 parts of "Irganox 1098" were added to the polymerizer. Thereafter, the mixture was polymerized together at a temperature of 245° C. under a reduced pressure of 0.1 mmHg for about 3 hours and 15 minutes while stirring the mixture. At the end of that time, a transparent viscous polymer was obtained.

The resultant polyester amide had a compositional ratio by weight of polybutylene terephthalate:polybutylene isophthalate:polyundecaneamide=30:30:40, and exhibited a melting point of 130° C. and a relative viscosity of 1.43.

Pellets of the polyester amide were pressed at a temperature of 180° C. to form a film having a thickness of 70μ. The resultant film was slit to a tape having a width of 1 cm. The tape was interposed between two pieces of polyester/cotton (65/35) broadcloth (T/C broadcloth). The resultant sandwich structure was heat-bonded at a temperature of 150° C. under a pressure of 300 g/cm² for 10 seconds. The bonded fabric exhibited a high adhesive strength of 2.7 kg/cm. Then, the bonded fabric was subjected to the same dry-cleaning and hot water laundry tests as those described in Example 30, respectively. After the testing, the bonded fabric retained high adhesive strength of 2.4 kg/cm and 2.3 kg/cm, respectively Example 33 (an adhesive for metals).

166 parts of terephthalic acid, 135 parts of 1,4-butanediol and 0.22 parts of titanium tetrabutoxide were placed in a flask. After the interior of the flask was purged with nitrogen gas, the contents of the flask were heated at a temperature of 220° C. for 3 hours and 30 minutes while stirring the reaction mixture. After the water and THF formed during the esterification reaction were distilled off from the reaction mixture, the whole of the resultant polyester prepolymer was transferred into a polymerizer equipped with a helical ribbon stirrer made of stainless steel and 120 parts of 12-aminododecanoic acid, 0.10 parts of titanium tetrabutoxide and 0.33 parts (0.1% based on the weight of the prepolymer) of "Irganox 1010" as a stabilizer were added to the polymerizer. Thereafter, the mixture was brought, in about one hour, to reaction conditions comprising a temperature of 245° C. and a pressure of 0.1 mmHg. The mixture was maintained at those conditions for 3 hours and 30 minutes while stirring the reaction mixture. At the end of that time, a transparent viscous melt was obtained. The resultant polymer contained in the polymerizer was discharged in the form of a strand into water and the strand was passed through a cutter to pelletize it.

The resultant polymer was a polyester amide having a compositional ratio by weight of polybutylene terephthalate:polydodecaneamide=67:33 and exhibiting a relative viscosity (ρr) of 1.49 and a melting point of 175° C.

The polyester amide pellets so prepared were fed into an extruder having a diameter of 40 mm and provided with a film-forming die and extruded through the die, thereby to form a film having a thickness of 50μ. The resultant film was slit to a tape having a width of 1 cm. The tape was interposed between pairs of metallic materials as indicated in Table 9 which had been previously heated to a temperature of 240° C. The sandwich structure was hot-pressed under a pressure of 1 kg/cm² for 8 seconds so as to prepare a testpiece.

The peeling strength of the testpiece was determined according to the method described in JIS-K 6854 by using a Tensilon. The testing was carried out at a peeling rate of 20 cm/min.

TABLE 9

| Metallic material to be bonded | Peeling strength (kg/cm) |
| --- | --- |
| Chromatized steel strip (TFS) | 6.0 |
| Primer coated TFS | 8.2 |
| Non-treated steel strip (black steel strip) | 3.4 |
| Aluminum | 2.8 |
| Copper foil | >5.0 |
| Tinplate | 3.7 |

EXAMPLES 34 THROUGH 38

Five types of polyester amides each having a compositional ratio by weight as indicated in Table 10 were prepared according to the same procedures as those described in Example 33.

Pellets of each polyester amide were pressed at a temperature of from 200° to 250° C. by using a hot press machine, thereby to form a film having a thickness of 80μ. The film was slit to a tape having a width of 1 cm. The tape was interposed between two pieces of chromatized steel strips (TFS) each having a thickness of 0.17 mm and which had been previously heated to a temperature of 220° C. The sandwich structure was press-bonded under a pressure of 1 kg/cm² for 12 seconds. Then, the bonded structure was air-cooled and used as a testpiece. The testpiece was subjected to the same peeling test as that described in Example 33. The measured value was recorded as the peeling strength of the testpiece before heat treatment. Then, the testpiece was subjected to heat treatment by immersing it in hot water having a temperature of 120° C. in an autoclave for 60 minutes. After cooling, the peeling strength of the testpiece was determined in the same manner.

For comparison purposes, separately, polybutylene terephthalate (Comparative Example 1), polybutylene terephthalate/polybutylene isophthalate copolyester (Comparative Example 2) and nylon-12 (Comparative Example 3) were prepared. The same bonding procedure and peeling test procedure as described above were carried out by using each of these adhesives. The measured results are shown in Table 10.

TABLE 10

| | | | | | | Peeling strength (Kg/cm) | |
| --- | --- | --- | --- | --- | --- | --- | --- |
| | | | | | | | After hot water treatment |
| | Polymer composition | | | Melting | | Before heat treatment | 120° C. × |
| Example No. | PBT | PBI | N-12 | point | ηr | | 60 min |
| This 34 | 75 | 0 | 25 | 202 | 1.45 | 5.7 | 3.4 |

TABLE 10-continued

| Example No. | Polymer composition PBT | Polymer composition PBI | Polymer composition N-12 | Melting point | ηr | Peeling strength (Kg/cm) Before heat treatment | Peeling strength (Kg/cm) After hot water treatment 120° C. × 60 min |
|---|---|---|---|---|---|---|---|
| invention 35 | 50 | 0 | 50 | 178 | 1.50 | >8.0 | 6.7 |
| invention 36 | 25 | 0 | 75 | 161 | 1.48 | 6.8 | 4.5 |
| invention 37 | 0 | 25 | 75 | 156 | 1.44 | 7.2 | 4.6 |
| 38 | 40 | 10 | 50 | 134 | 1.49 | 6.0 | 3.7 |
| Comparative Example 1 | 100 | 0 | 0 | 226 | 1.48 | 3.5 | peeled off |
| Comparative Example 2 | 65 | 35 | 0 | 165 | 1.49 | 3.8 | peeled off |
| Comparative Example 3 | 0 | 0 | 100 | 180 | 1.52 | 5.0 | 1.5 |

EXAMPLE 39

2.00 parts of terephthalic acid, 1.33 parts of isophthalic acid, 3.25 parts of 1,4-butanediol, 2.41 parts of 12-aminododecanoic acid and 0.0018 parts of titanium tetrabutoxide were placed in a reaction vessel. After the interior of the vessel was purged with nitrogen gas, the contents of the vessel were heated at a temperature of 230° C. for 3 hours and 45 minutes while stirring the reaction mixture. After 1.25 parts of a mixture of the water and THF formed and the non-reacted 1,4-butanediol were distilled off from the reaction mixture, the resultant reaction mixture was transferred into a polymerizer and 0.0037 parts of titanium tetrabutoxide and 0.0066 parts of "Irganox 1010" were added to the polymerizer. The mixture was brought, in about one hour, to reaction conditions comprising a temperature of 245° C. and a pressure of 0.1 mmHg. The mixture was maintained at those conditions for one hour and 55 minutes. At the end of that time, a transparent viscous polymer was obtained.

The polyester amide had a compositional ratio by weight of PBT:PBI:N-12=40:27:33 and exhibited a relative viscosity of 1.41 and a melting point of 102° C. A 15% solution of the polyester amide in chloroform was spread on the surface of pairs of an electrolytically treated copper foils each having a thickness of 35μ or the surface of each pair of aluminum foils each having a thickness of 50μ by means of an applicator. The amount of the solution applied was such that the thickness of the dry coating was about 10μ. The adhesive-coated surfaces of the copper foils or the aluminum foils were laminated on each other and the laminate was hot pressed at a temperature of 170° C. for 10 seconds. A sample having a width of 1 cm was prepared from the bonded laminate. The peeling strength of the sample was as shown in Table 11.

For comparison purposes, "Vitel PE 207" (copolyester) and "Vylon 30p" (copolyester), which adhesives are commercially available from Goodyear Co. and Toyo Boseki K.K., respectively, were evaluated for peeling strength in the same manner as described above. The results are shown in Table 11.

TABLE 11

| Sample | Peeling strength (kg/cm) Copper foil | Peeling strength (kg/cm) Aluminum foil |
|---|---|---|
| Polyester amide of the present invention | >3.5 | >3.5 |
| "Vitel 207" (Comparative Example) | 0.56 | 0.20 |
| "Vylon 30p" (Comparative Example) | 1.5 | 0.80 |

Industrial Utility Of The Invention

The polyester amide of the present invention is excellent in mechanical strength, impact resistance, transparency, flexibility, oil resistance, and thermal aging resistance. Also, the polyester amide of the present invention can be formed into films, fibers and other shaped articles by extrusion and injection molding. The polyester amide of the present invention is effective for bonding fibers and exhibits an excellent resistance to perchloroethylene. Moreover, the polyester amide of the present invention is effective for bonding metals and metal materials bonded by the polyester amide exhibit an excellent workability. Therefore, the polyester amide of the present invention can be utilized as a hot-melt adhesive for fibers and an adhesive for metals.

In addition, because the polyester amide of the present invention exhibits a unique electrical property under the action of heat, it can be used as a heat-sensitive element.

We claim:

1. A polyester amide comprising (A) an ester unit derived mainly from a benzenedicarboxylic acid and 1,4-butanediol and (B) an amide unit comprising dodecaneamide and/or undecaneamide in a weight ratio of ester unit to amide unit of from 5:95 to 95:5.

2. A polyester amide as claimed in claim 1, wherein the weight ratio of ester unit to amide unit is in a range of from 20:80 to 95:5.

3. A polyester amide as claimed in claim 1, wherein the weight ratio of ester unit to amide unit is in a range of from 25:75 to 80:20.

4. A polyester amide as claimed in claim 1, wherein the benzenedicarboxylic acid is terephthalic acid and/or isophthalic acid.

5. A process for producing a polyester amide which comprises copolymerizing (a) at least one acid component selected from benzenedicarboxylic acids and ester-forming derivatives thereof, (b) at least one diol component selected from 1,4-butanediol and its ester-forming derivative and (c) at least one amide-forming component selected from 12-aminododecanoic acid, 11-aminoundecanoic acid and amide-forming derivatives thereof.

6. An adhesive for fibers which comprises a polyester amide comprising (A) an ester unit derived mainly from a benzenedicarboxylic acid and 1,4-butanediol and (B) an amide unit comprising dodecaneamide and/or undecaneamide and having a composition falling on or within a region, in a triangular composition diagram in FIG. 2, defined by the co-ordinates E, F, G, H, I and J.

7. An adhesive for fibers as claimed in claim 6, wherein the polyester amide has a composition falling on or within a region, in the triangular composition diagram in FIG. 2, defined by the co-ordinates E', F', G', H' and J.

8. An adhesive for metals which comprises a polyester amide comprising (A) an ester unit derived mainly from a benzenedicarboxylic acid and 1,4-butanediol and (B) an amide unit comprising dodecaneamide and/or undecaneamide in a weight ratio of ester unit to amide unit from 5:95 to 80:20.

9. An adhesive for metals as claimed in claim 8, wherein the weight ratio of ester unit to amide unit falls on or within a region, in the triangular compositon diagram in FIG. 3, defined by the co-ordinates K', L', M, M', N' and O.

10. An adhesive for metals as claimed in claim 8, wherein the weight ratio of ester unit to amide unit falls on or within a region, in the triangular composition diagram in FIG. 3, defined by the co-ordinates O, N', M' and N.

11. The process as described in claim 5, wherein the copolymerization procedure comprises:
(i) first reacting the acid component (a) with the diol component (b) in a molar amount of about 1.05 to about 2.0 times that of the acid component (a) and with the amide-forming component (c) in the presence of an esterification catalyst at a temperature of from about 150° C. to about 260° C. under substantially atmospheric pressure; and then,
(ii) polymerizing the resultant reaction mixture at a temperature of from about 200° C. to about 270° C. under a reduced pressure of about 10 mmHg or less.

12. The process as described in claim 5, wherein the copolymerizing procedure comprises:
(i) pre-polymerizing the acid component (a) and the diol component (b) at a temperature of from about 150° C. to about 260° C. under substantially atmospheric pressure;
(ii) mixing the resultant polyester prepolymer, having an average degree of polymerization of from 3 to 8, with the amide-forming component (c); and then,
(iii) polycondensing the resultant reaction mixture at a temperature of from about 200° C. to about 270° C. under reduced pressure.

* * * * *

UNITED STATES PATENT AND TRADEMARK OFFICE
CERTIFICATE OF CORRECTION

PATENT NO. : 4,376,194

DATED : March 8, 1983

INVENTOR(S) : Chiaki Tanaka, Shinobu Nakashima and Nagayoshi Naito

It is certified that error appears in the above-identified patent and that said Letters Patent is hereby corrected as shown below:

Column 3, line 1, after "H" insert a comma.

Column 4, line 19, "withing" should read --within--

Column 18, line 1, "($\rho$r) should read --($\mu$r)--

Signed and Sealed this

Tenth Day of July 1984

[SEAL]

Attest:

GERALD J. MOSSINGHOFF

Attesting Officer

Commissioner of Patents and Trademarks